United States Patent
Cavalcante et al.

(10) Patent No.: US 10,217,067 B2
(45) Date of Patent: Feb. 26, 2019

(54) SYSTEM, METHOD AND PROGRAM PRODUCT FOR SCHEDULING INTERVENTIONS ON ALLOCATED RESOURCES WITH MINIMIZED CLIENT IMPACTS

(71) Applicant: International Business Machines Corporation, Armonk, NY (US)

(72) Inventors: Victor F. Cavalcante, Campinas (BR); Guilherme S. Elias, Sumare (BR); Marcos V. L. Paraiso, Campinas (BR); Vagner F. De Santana, Sao Paulo (BR); Sergio Varga, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 14/645,399

(22) Filed: Mar. 11, 2015

(65) Prior Publication Data

US 2016/0269312 A1    Sep. 15, 2016

(51) Int. Cl.
*H04L 12/917*    (2013.01)
*G06F 9/50*    (2006.01)
(Continued)

(52) U.S. Cl.
CPC ....... *G06Q 10/0631* (2013.01); *G06F 9/5072* (2013.01)

(58) Field of Classification Search
CPC ......... G06F 2209/504; G06F 2209/508; G06F 8/65; G06F 8/68; G06F 8/70; G06F 8/71; G06F 9/5055; G06F 9/5061; G06F 9/5066; G06F 9/5072; G06F 9/45537; G06F 9/45558; G06F 8/63; G06F 9/45533;
(Continued)

(56) References Cited

U.S. PATENT DOCUMENTS 7,334,222 B2    2/2008 Keller
7,509,518 B2    3/2009 Bailey et al.
(Continued)

FOREIGN PATENT DOCUMENTS

WO    2013185166    12/2013

OTHER PUBLICATIONS

Kettinger et al., "Business process change: a study of methodologies, techniques, and tools." MIS quarterly 21.1 (1997).
(Continued)

*Primary Examiner* — Nicholas R Taylor
*Assistant Examiner* — Michael Li
(74) *Attorney, Agent, or Firm* — Law Office of Charles W. Peterson, Jr.; Louis J. Percello, Esq.

(57) ABSTRACT

A system, method and program product for applying interventions to allocated resources intervention impacts identified and minimized. After receiving a change request requesting changes involving shared resources, elements affected by implementing the requested change are identified. Individual impacts to elements in each layer are determined moment by moment during a selected time frame, and overall impact to client activity is determined from individual impacts for the entire time frame. From the overall impact, a time may be identified within the time frame that has a minimum overall impact for implementing the requested change.

18 Claims, 8 Drawing Sheets

(51) Int. Cl.
*H04L 12/911* (2013.01)
*G06Q 10/06* (2012.01)

(58) Field of Classification Search
CPC .. G06Q 10/06; G06Q 10/0631; H04L 41/082; H04L 41/5025; H04L 43/0876; H04L 47/70; H04L 47/803; H04L 67/10; H04L 67/34; H04L 67/1008; H04L 67/1036
See application file for complete search history.

(56) References Cited

U.S. PATENT DOCUMENTS

| | | | | |
|---|---|---|---|---|
| 7,614,046 | B2* | 11/2009 | Daniels | G06F 8/68 |
| | | | | 717/127 |
| 7,917,407 | B1 | 3/2011 | Reed et al. | |
| 8,260,654 | B2 | 9/2012 | Owens et al. | |
| 8,291,382 | B2 | 10/2012 | Bryant et al. | |
| 8,595,246 | B2 | 11/2013 | Fay et al. | |
| 8,621,080 | B2 | 12/2013 | Iyoob et al. | |
| 2006/0161883 | A1* | 7/2006 | Lubrecht | G06Q 10/06 |
| | | | | 717/104 |
| 2009/0171704 | A1 | 7/2009 | Bobak et al. | |
| 2012/0233328 | A1* | 9/2012 | Iyoob | G06F 9/5061 |
| | | | | 709/226 |
| 2012/0331113 | A1* | 12/2012 | Jain | G06F 9/5072 |
| | | | | 709/220 |
| 2013/0219042 | A1* | 8/2013 | Behrendt | H04L 43/0876 |
| | | | | 709/224 |
| 2013/0253992 | A1 | 9/2013 | Pyrlina | |
| 2014/0164624 | A1* | 6/2014 | Ames | G06F 9/45558 |
| | | | | 709/226 |
| 2014/0229939 | A1* | 8/2014 | Dias de Assuncao | G06F 8/63 |
| | | | | 718/1 |
| 2015/0081910 | A1* | 3/2015 | Assuncao | G06F 9/5055 |
| | | | | 709/226 |

OTHER PUBLICATIONS

Bajec et al., "A methodology and tool support for managing business rules in organisations." Information Systems 30.6 (2005): 423-443.

Ahmad et al., "Business process reengineering: critical success factors in higher education." Business Process Management Journal 13.3 (2007): 451-469.

Mehboob et al. "An Approach for comparison of architecture level change impact analysis methods and their relevance in web systems evolution." Software Engineering Conference, 2009. ASWEC'09. Australian. IEEE, 2009.

* cited by examiner

SYSTEM, METHOD AND PROGRAM PRODUCT FOR SCHEDULING INTERVENTIONS ON ALLOCATED RESOURCES WITH MINIMIZED CLIENT IMPACTS

BACKGROUND OF THE INVENTION

Field of the Invention

The present invention is related to maintaining up to date allocated shared resources and more particularly to selecting an optimal time for applying pending patches and updates to virtual machines, software and hardware satisfying resource sharing requests with minimal delay and disruption in infrastructure, and in application and business processes.

Background Description

Acquiring, managing and maintaining Information Technology (IT) is a major budgetary concern for any modern organization. Moreover, since organizations seldom use local physical hardware (e.g., mainframe servers) at full capacity, frequently, some capacity is wasted. To reduce IT infrastructure and applications costs and waste, instead of acquiring physical hardware, organizations are increasingly consolidating workload on shared hardware, using virtual machines (VMs) hosted on provider servers or computers.

Ideally, each VM appears as an independent computer (e.g., a virtual processor, memory and disk space) running, for example, an operating system (OS) and a software stack with one or more active software elements (e.g., applications or other software). As with any state of the art computer system, virtual machines require periodic and aperiodic incident fixes, including hardware and software updates and patches effected in what are known as interventions. Thus, a typical intervention may fix hardware, patch bugs and security weaknesses, patch software features and/or effect environment changes that may be of critical importance.

Worldwide enterprises, such as the stock exchange and multinational banks, increasingly use VMs in reliance on cloud based applications, such as business-to-business (B2B) or business-to-consumer (B2C) applications. These enterprises use typical B2B and B2C applications including, for example, for banking transactions, payment solutions, logistics, maintaining Internet based stores, and managing factory automated processes. A mistimed intervention, however, can be costly to provisioned for B2B or B2C applications, directly affecting client business revenues and diminishing the provider's reputation. Consequently, provider IT system planning and management have given priority to selecting an intervention time either to minimize the impact of applying interventions, or to prioritizing applying interventions tightly scheduled in consideration of client needs.

Previously, in scheduling these interventions IT system planning and management support have relied on isolated impact analysis. IT support evaluated how interventions impacted individual infrastructure elements and applications to make educated guesses of how businesses are impacted, e.g., based on experience gathered from experts and customer feedback. Using the evaluation results, IT support can predict the breadth and depth of the effects on an organization from intervention modifications, especially in the context of service management. Unfortunately, however, there is a dearth of end-to-end knowledge for complex systems and deployed applications. Moreover, configuration information may be incomplete or stale. This has made it difficult to assess overall intervention impact, and to evaluate system failure impacts from the customer's point of view. Consequently, organizations infrequently select the optimal time to apply interventions, and frequently select less than optimum times, unnecessarily and significantly impact business customers.

Thus, there is a need for determining the time to apply interventions to IT system resources to minimize potential system impact, and more particularly, there is a need for considering all shared resource elements that may be affected by an intervention in determining the optimum time to apply the intervention for minimized impact on system clients.

SUMMARY OF THE INVENTION

A feature of the invention is a time determinable to schedule system interventions to minimize impact to client operations;

Another feature of the invention is impacts to client operations pre-determined over a time period for determining an optimal time to schedule system interventions to minimize impact to client operations;

Yet another feature of the invention is layer by layer impacts to system elements, e.g., in a cloud environment, are determined moment by moment over a time period for projecting overall impacts on client operations to pre-determine an optimal time to schedule cloud system interventions to minimize intervention impact to client operations.

The present invention relates to a system, method and program product for applying interventions to allocated resources. After receiving a change request requesting changes involving shared resources, elements affected by implementing the requested change are identified. Individual impacts to elements in each layer are determined moment by moment during a selected time frame, and overall impact to client activity is determined from individual impacts for the entire time frame. From the overall impact, a time may be identified within the time frame that has a minimum overall impact for implementing the requested change.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is further understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed and as further indicated hereinbelow.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components or elements (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
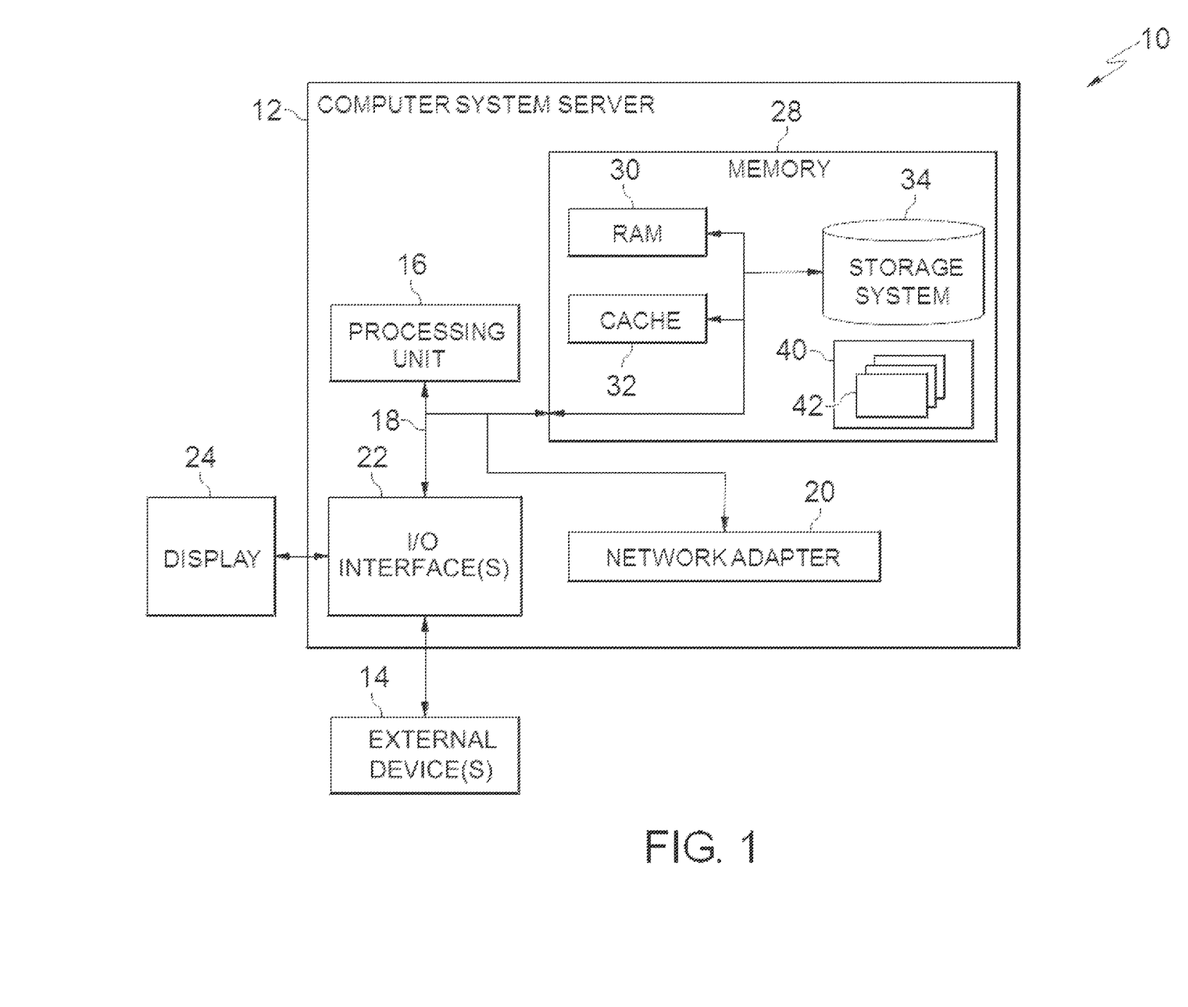
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
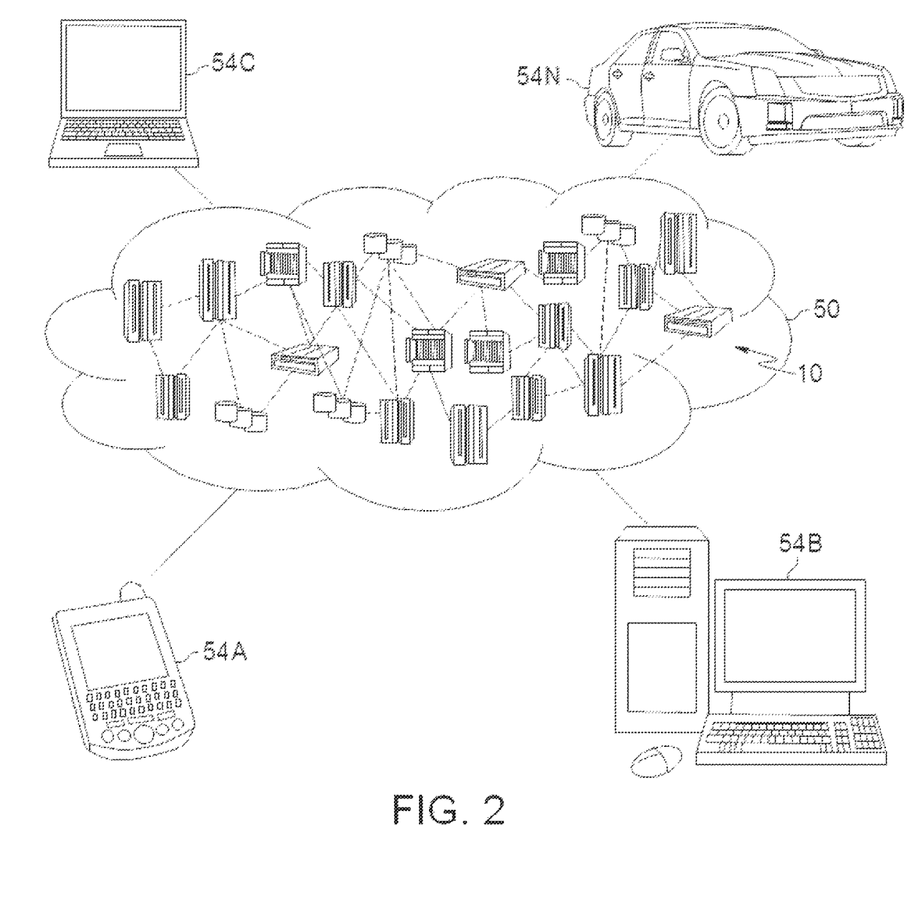
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
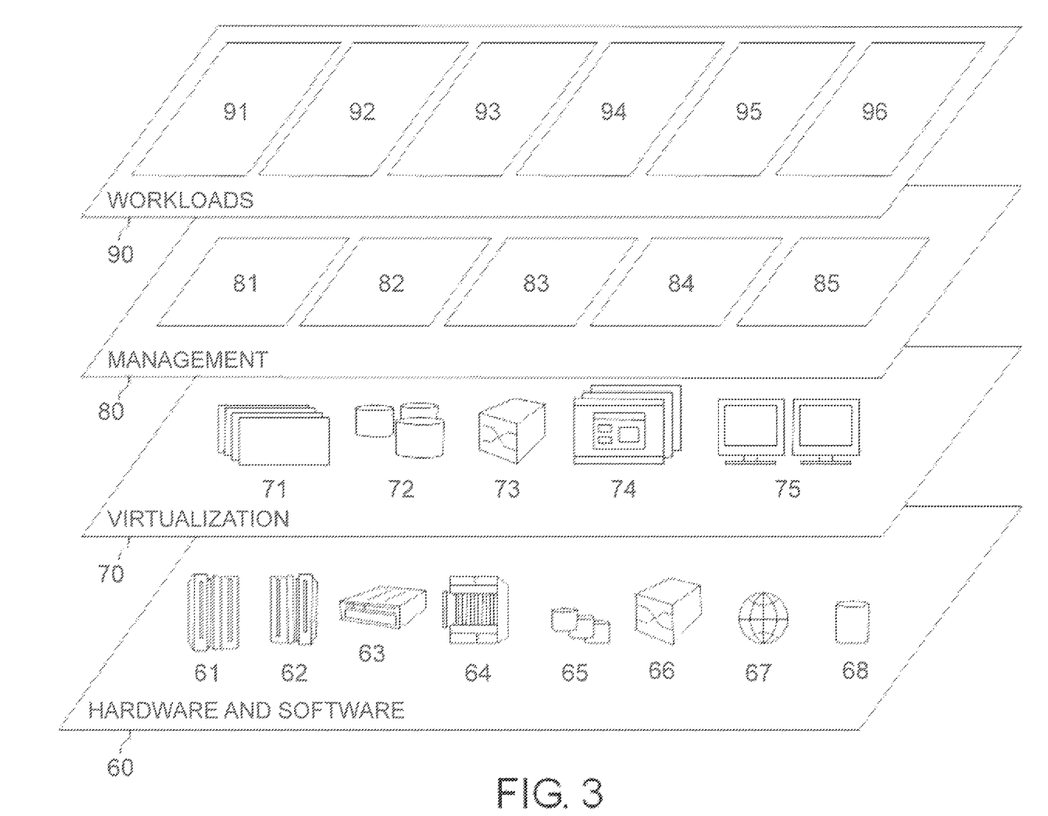
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software or infrastructure layer ($L_I$) 60 includes hardware and software components or elements. Examples of hardware components include: mainframes 61; RISC (Reduced Instruction Set Computer) architecture based servers 62; servers 63; blade servers 64; storage devices 65; and networks and networking appliances and components 66. In some embodiments, software components include network application server software (e.g., Windows and Linux) 67 and database software 68.

Virtualization or application layer ($L_A$) 70 provides an abstraction layer from which the following examples of virtual entities may be provided: virtual servers 71; virtual storage 72; virtual networks 73, including virtual private networks; virtual applications and operating systems (e.g., eBusiness software, Enterprise resource planning (ERP) software and customer relationship management (CRM) software) 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer, also referred to as the business process layer ($L_{BP}$) 90 with regard to the present invention, provides examples of functionality for which the cloud computing environment may be utilized. Examples of workloads and functions which may be provided from this layer include: mapping and navigation 91; software development and lifecycle management 92; virtual classroom education delivery 93; client support including data analytics processing 94; transaction processing (e.g., sales and billing) 95; and specialized business applications such as enterprise management governance 96.

Typically, service level management 84 and SLA planning and fulfillment 85 (management layer 80) schedule interventions to address changes and service requests or even unexpected incidents. These interventions apply to elements (E) in the other three layers, e.g., at infrastructure level in hardware and software layer 60 (where network application server software 67 and database software 68 are considered infrastructure), at applications level in virtualization layer 70, and/or at the business process level in workloads layer 90. Interventions in any aspect of IT provided for an organization may trigger activities and modifications affecting stability of dependent businesses. Selecting the optimum time for an intervention requires predicting how deeply the intervention might affect all related IT system elements and related environments over a given time frame; and further, requires predicting how respective dependent business might be affected by those affected elements and environments.

The present invention characterizes individual impacts to elements (E) moment by moment (T) in the infrastructure layer ($L_I$) 60, applications layer ($L_A$) 70 and business process layer ($L_{BP}$) 90 to determine an overall system impact (I) on clients during a time frame ($[T_I,T_F]$) for applying an intervention. Thus, system management and support may select a time within that time frame that minimizes undesired system instability and reduces the likelihood of any critical situations occurring that may undesirably impact client businesses.

Figure 4:
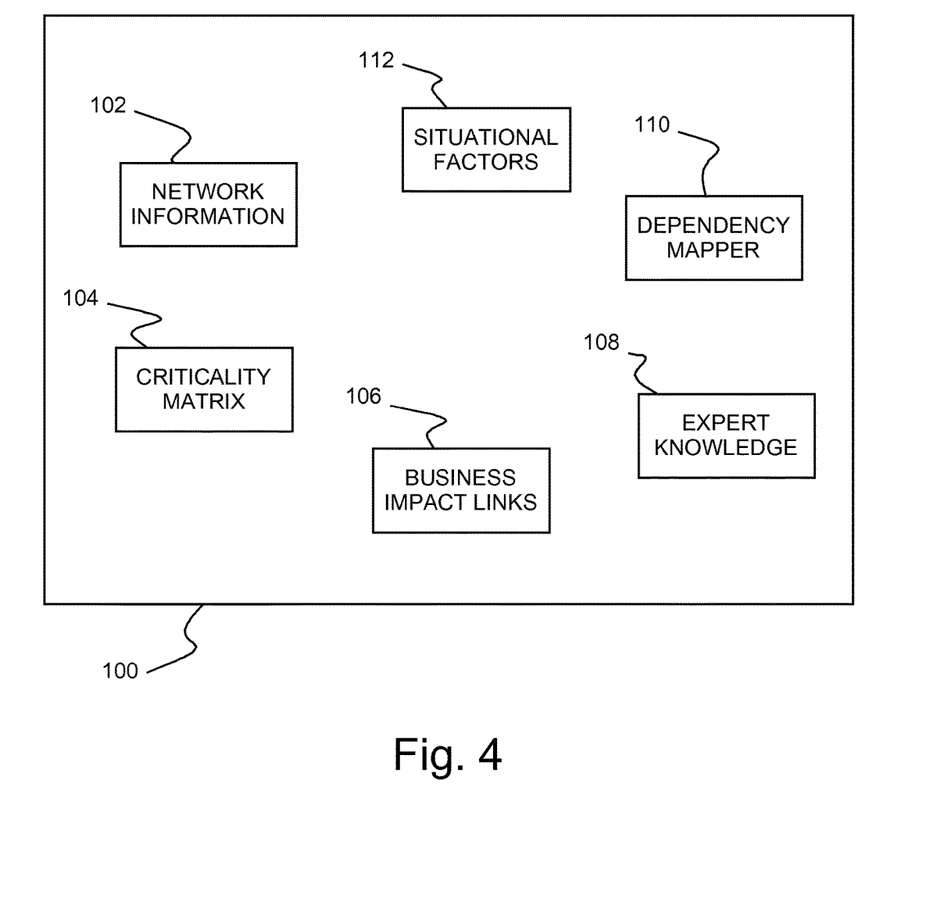
FIG. 4 shows an example of an impact estimation support tool for quantifying the potential overall impact of interventions at discrete instances or intervals during a selected time window, according to a preferred embodiment of the present invention.

FIG. 4 shows an example of an impact estimation support tool 100 in resource provisioning unit 81 used by service level management 84 and SLA planning and fulfillment 85 support teams to quantify the potential overall impact of interventions at discrete instances or time intervals during a selected time window, according to a preferred embodiment of the present invention. The preferred impact estimation support tool 100 quantifies local impacts (I(L,E,T)) from an intervention to consider individual impacts at each level 60, 70, 90 during each interval or period ($T_I \le T \le T_F$). Since individual impacts on elements on each layer may have more or less effect on the overall business impact over the other layers, local impacts (I(L,E,T)) are weighted by layer weights ($\alpha_{BP}$, $\alpha_A$, $\alpha_I$), indicating that importance of the impacts on the final impact, i.e., I(E,T)=f($\alpha_{BP}$*I($L_{BP}$,E,T), $\alpha_A$*I($L_A$,E,T), $\alpha_I$*I($L_I$,E,T)).

A preferred estimation support tool 100 includes network information 102, a criticality matrix 104, a collection 106 of links to business impacts, collected expert knowledge 108, an application dependency mapper 110 and a description of situational factors 112. The estimation support tool 100 propagates intervention inputs through connected elements at various affected system levels or layers, including the infrastructure level (in hardware and software layer) 60, the applications level (virtualization layer) 70; and/or the business process level (workloads layer) 90 to estimate individual and collective impacts. The estimation support tool 100 gives SLA planning and fulfillment 85 the ability to test various, "what if," scenarios to collectively simulate and predict specific intervention impacts during selected time windows. These predictions indicate suitable times within the selected time windows for performing intervention associated tasks.

The network information (N(E)) 102 or alternately, neighborhood topology, may describe the connections among the elements (servers, applications or business processes) that are reachable from element E.

The criticality matrix (CM(E)) 104 indicates or quantifies how critical each infrastructure element E is over the whole system. This may include, for example, any infrastructure level 60 criticality information for any physical device, i.e., hardware component 61, 62, 63, 64, 65, 66, 67, 68.

Business impacts links (CBI(e)) 106 match IT elements and customer business impacts at the business process level 90. The business impacts links may be based on, for example, contract SLA information and financial impact information.

The expert knowledge (EK(E,$T_I$,$T_F$)) 108 contains practical experience information collected from subject-matter experts (SMEs) or from logs/historical data of previous interventions. Experts can add expert knowledge 108 to endorse expectations regarding the effect caused by an element (E) at each layer 60, 70, 90 during the time window.

The application dependency mapper (DMA(E)) 110 maps application layer dependencies between elements (E) among the impacted elements. The application dependency mapper (DMA(E)) 110 may be. for example, the IBM® Tivoli® Application Dependency Discovery Manager (TADDM).

The situational factors (S($T_I$,$T_F$)) 112 includes factors affecting the particular enterprise during the time period. Situational factors 112 may impact application layer 70 and/or business process layer 90 elements and include, for example, seasonality information, describing exemptions and peak seasonal information about the business customer business during the time window [$T_I$,$T_F$]. Business seasonality information may include, for example, fixed and optional holidays, vacation, business calendars, business day start and finish times, expected workload peak dates, and projected expected lower performance dates from capacity planning. It should be noted that expert knowledge 108 and situational factors 112 may impact elements in each layer 60, 70, 90, weighting each to increase or decrease impact.

Figure 5:
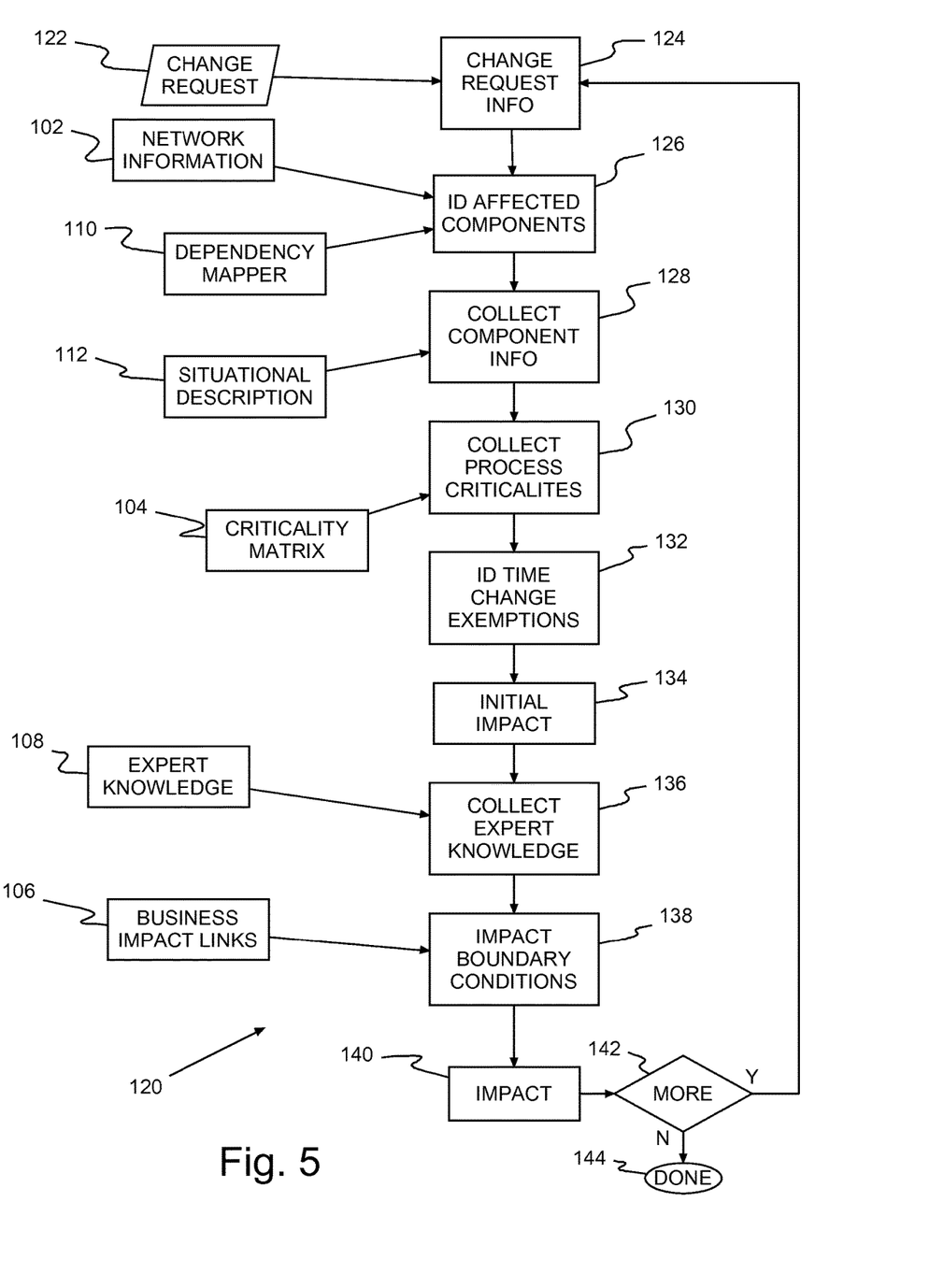
FIG. 5 shows an example of service level management and SLA planning and fulfillment support teams using the impact estimation support tool to quantify the potential overall impact of interventions over a given time window.

FIG. 5 shows an example of service level management 84 and SLA planning and fulfillment 85 support teams quantifying the potential overall impact (I(E,T)) of interventions 120 over time window [$T_I$,$T_F$], using the impact estimation support tool 100 in FIG. 4, according to a preferred embodiment of the present invention. Essentially, the preferred estimation support tool 100 iteratively determines I(E,T) moment by moment for each interval or time period ($T_I \le T \le T_F$).

When the support team(s) receives a change request 122 requiring an intervention that triggers a change to a client configuration, the estimation support tool 100 retrieves change/service information inputs 124 about the request. The change/service information inputs 124 may list elements involved in the intervention, schedule options and time windows.

The preferred estimation support tool 100 also identifies system elements 126, i.e., elements in each layer that are likely to be impacted by changes from the intervention. These system elements may be identified, for example, from network information/topology 102 and mapped dependencies from the dependency mapper 110 for each affected element in infrastructure layer 60, application layer 70, and business process layer 90. The preferred estimation support tool 100 identifies all elements affected, directly or indirectly, by the intervention.

Next, the estimation support tool 100 collects element information 128 for affected elements. Collected information may include situational information 112 as well as current and historical information related to the affected elements. The preferred estimation support tool 100 also generates weights from the collected element information based on configuration parameters for each layer 60, 70, 90. Historical information includes prior impacts to each affected element in previous interventions x component and, for example, may be from previous impact projections or from actual change history, previous change authorizations, root cause analysis (RCA), and previous change tickets.

Then, the estimation support tool 100 collects standardized business process impact criticalities 130 from SLA planning and fulfillment 85, and criticality information for all affected elements from criticality matrix 104. These business process criticalities 130 indicate the importance of layer by layer impacts on the final impact, which the estimation support tool 100 uses to determine layer weights ($\alpha_{BP}$, $\alpha_A$, $\alpha_I$).

Next, for the current instance or moment the estimation support tool 100 identifies impact exemptions 132 (e. g., for a peak season and/or seasonality) for each input based on change window times, and determines initial element impacts I(L,E,T) 134, and overall determines impact between start time and finish time. Thus in identifying impact exemptions 132, the estimation support tool 100 may collect any seasonality data that potentially impact the change, e.g., peak season dates, holidays, exemption dates and/or any time lost from impacts to a customer's business.

The estimation support tool 100 collects 136 any available expert knowledge 108 with regard to the intervention. The estimation support tool 100 adjusts the weights based on expert knowledge 108 recommendations regarding the overall effect of each affected element in each layer 60, 70, 90.

Then, the estimation support tool 100 determines individual layer impacts 138, e.g., correlating initial impacts to the particular business as identified in the business impacts links 106, and determines final, overall impact for the current moment.

The estimation support tool 100 simulates the intervention to determine the overall impact 140 for the current instant (i.e., a time slice in the selected time frame) for the entire business process, as propagated through the entire process in all affected elements in layers 60, 70 and 90 for each schedule input. The simulation results are a detailed report of the expected impact for each given period of time.

Optionally, there may be additional simulation conditions for analysis e.g., on a different date or time of day. For example, the first pass may have yielded impacts that are too high during initial time frame. Since the initial results are unacceptable, support may decide 142 to rerun the simulation for another time frame or date. The estimation support tool 100 returns to retrieve request information 124 for each subsequent time slice within the new time frame or at the date. When the simulation achieve satisfactory results 142, analysis is complete 144.

Figure 6A:
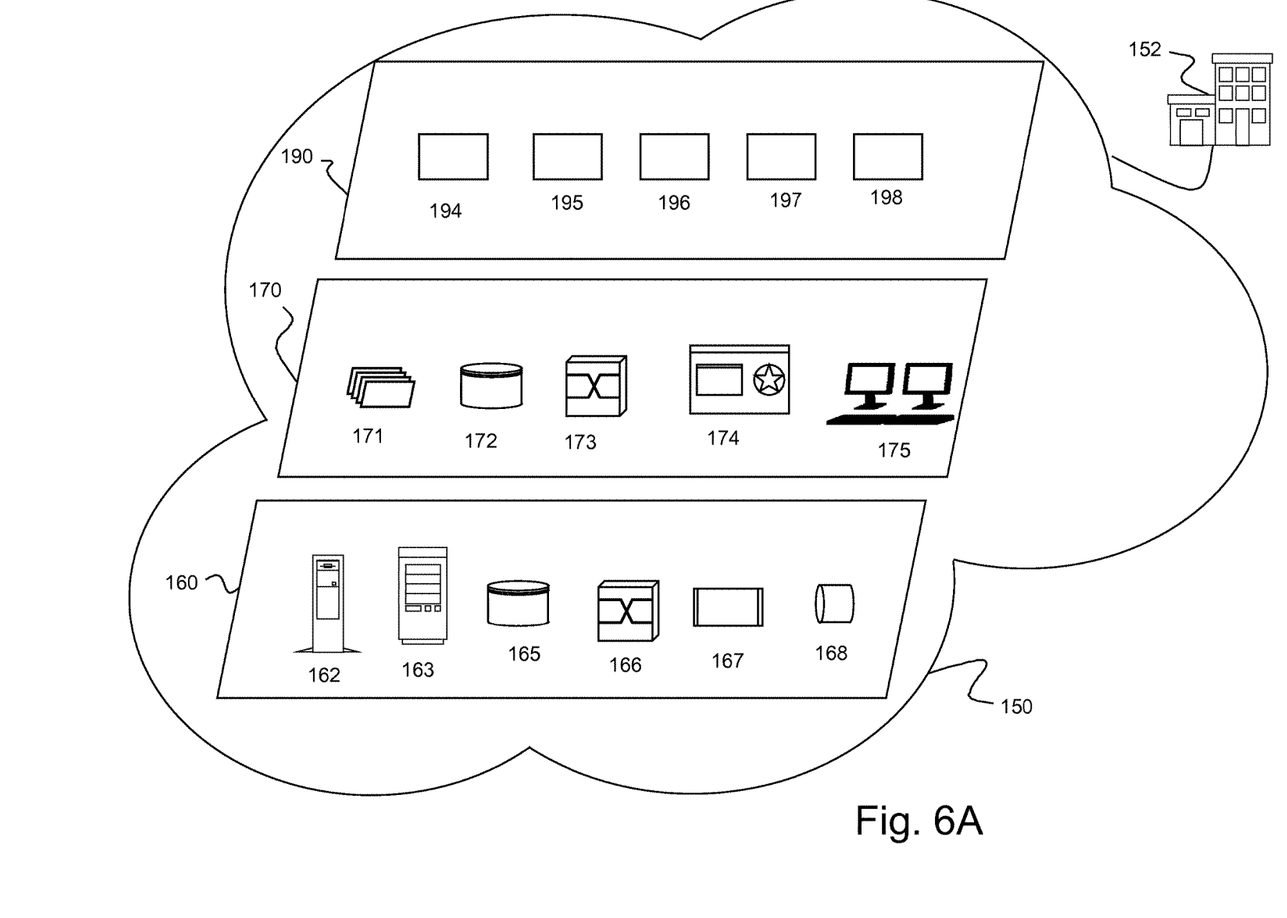
FIGS. 6A and B show a simple example of application of the present invention to a cloud providing business process support to a top tier bank and a severity ticket showing the average impact resulting from an intervention on two infrastructure layer servers supporting the bank.
Figure 6B:
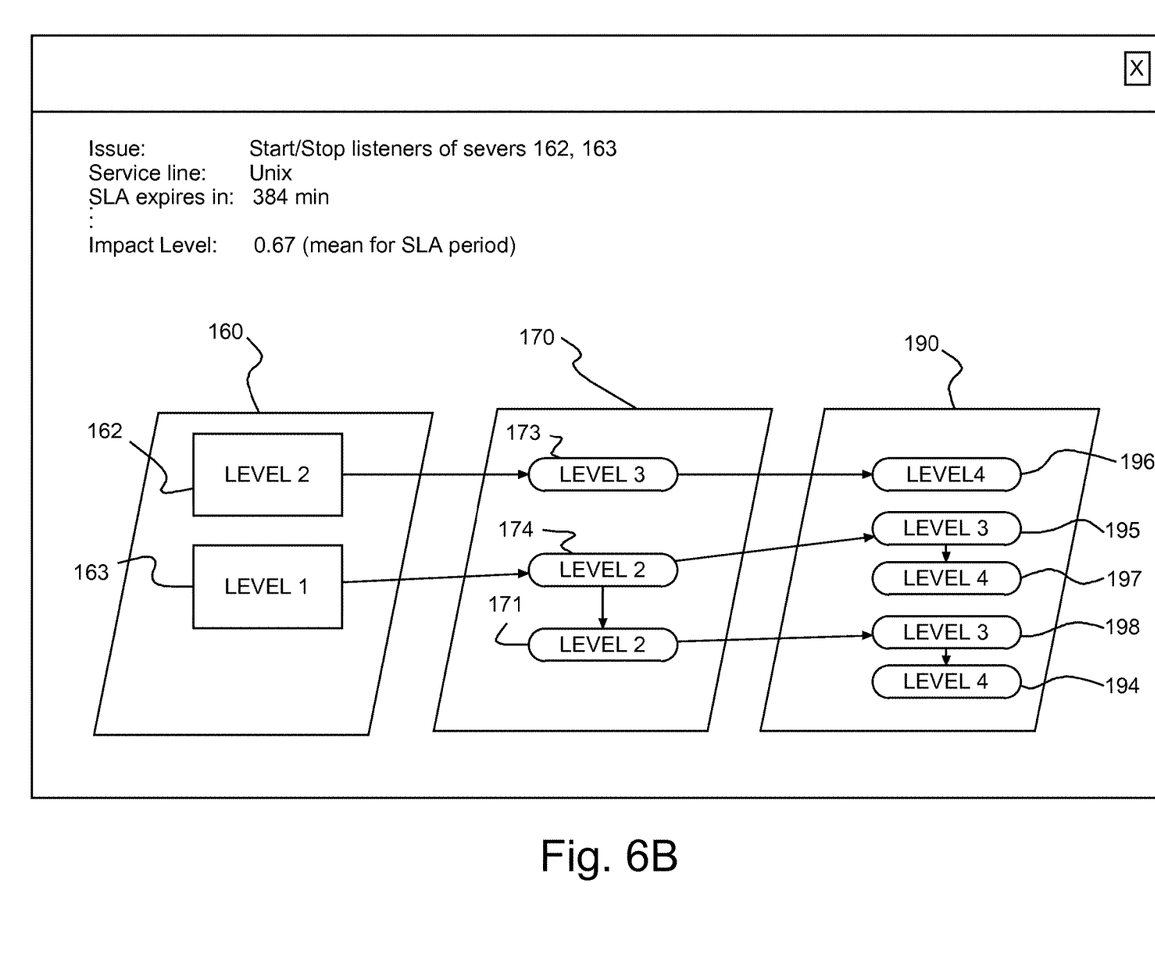

FIGS. 6A and B show a simple example of application of the present invention to a cloud 150 providing business process support to a top tier bank 152 and a severity ticket 154 showing the average impact resulting from an intervention on two infrastructure layer 160 servers 162, 163 supporting the bank 152. In this example, the infrastructure layer ($L_I$) 160, application layer ($L_A$) 170 and business process layer ($L_{BP}$) 190 are substantially similar to the infrastructure layer 60, application layer 70 and business process layer 90 of FIG. 3.

The infrastructure layer 160 includes Unix server 162; Unix web server 163; storage devices 165; and, networking infrastructure 166, network Unix application server software 167 and banking database software 168. The application layer 170 includes virtual servers 171; virtual storage 172; virtual networks 173, e.g., for online banking; eBusiness and banking software applications, ERP software, CRM software and security software 174; and banking clients 175, e.g., online banking and automated teller machines (ATMs). Likewise, the business process layer 190 includes banking client support 194; banking transaction (e.g., billing and sales) processing 195; banking management and governance 196; specialized banking applications 197, e.g., Electronic data interchange (EDI); and, Home Broker system 198.

Business process layer 190 functions may be continuously used or available, periodically used or available, randomly used or available, or some combination thereof. In this example, normal banking and broker services, such as banking client support 194 EDI and Home Broker system 198, which has worldwide use and is available to millions of users for daily stock exchange operations, may be active during normal business hours. Banking transaction processing 195 and some specialized banking applications 197 may be active mostly after business hours, e.g., for bank to bank transfers, end of day bookkeeping and accounting. Banking management and governance 196 and other specialized banking applications 197 may be active at the end of specific business periods, e.g., end of the week, month, quarter and fiscal year. Determining how any particular intervention will affect the bank 152 and its customers, depends on what business process layer 190 functions are active and when.

Banking software applications, ERP software, CRM software and security software 174, and especially the Unix security software, requires frequent patches. For example, Unix security software may be patched to address newly identified security threats to prevent security breaches. Depending on the extent of each patch, interventions required for applying the patches may range from seamless, unobtrusive updates to full Unix operating system restarts, and even server 162, 163 reboots. The bank 152 support team has a Unix operating system team that schedules interventions for installing security. The bank 152 also has official schedule options for scheduling for system interventions.

If the Home Broker system is not installed directly on the servers involved in the intervention, for example, patching security will have a much greater impact during some periods than others, e.g., on workdays as opposed to holidays and/or weekends. Previously, the Unix team typically, was unaware of the full and immediate effects of any intervention, directly or indirectly impacting the Home Broker system. Moreover, the Unix team was also unaware of any individual impact on infrastructure (i.e., on a given server or group of servers), on active applications and on active business processes, or the level of aggregate impact. So for example, applying a patch to one server 163 may be a high level, severity level 1, impact. That level 1 impact to server 163 requires temporarily taking that sever 163 off line. With that server 163 off line, the other server(s) 162 must quickly increase workload to compensate for the loss of server 163, balancing workload(s). The increased workload may cause frequent user connection rejections from the Home Banking system.

In the graphical example 154 of FIG. 6B, however, both servers 162, 163 are taken off line during an intervention, either denying some services to clients during the intervention or with other servers (not shown) compensating for the temporary loss of servers 162, 163. Taking server 162 has less impact (level 2) on services, than the severity level 1 impact for server 163. Further, the impact of taking server 162 to application layer 170 elements, virtual networks 173, is less (level 3) and business process layer 190 elements banking management and governance 196 even less (level 4).

Similarly, the severity level 1 impact from taking down server 163 directly impacts virtual servers 171 and security software 174 (level 2), which in turn impact banking transaction processing 195 and Home Broker system 198 at level 3. The level 3 impact to business process layer 190 elements 195, 198 impacts banking client support 194 and EDI 197 at level 4.

A preferred impact estimation support tool 100, however, graphical identifies impacts for the Unix team, e.g., using a typical graphical user interface (GUI). The GUI graphically displays specific impacts at each level and aggregate effects from interventions.

Figure 7:
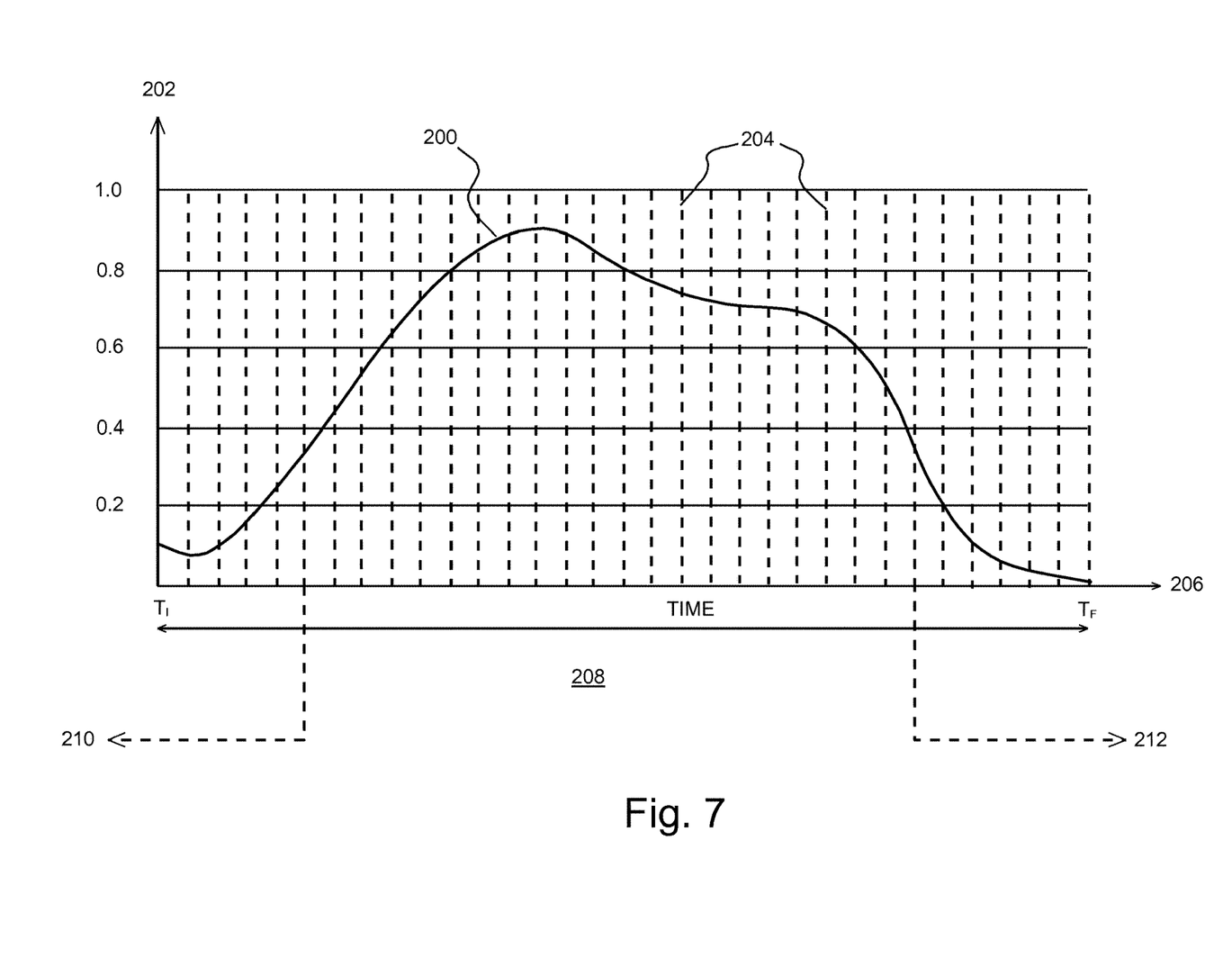
FIG. 7 shows an example of a typical graphical user interface (GUI) for graphically indicating the overall impact.

FIG. 7 shows a graphical example the overall impact 200 of an intervention, e.g., using a GUI. In this example, impact magnitude 202 may range from seamless with no impact (0.0) to completely halting the Home Broker system maximum impact (1.0). The preferred impact estimation support tool 100 quantifies impact magnitude 202 moment by moment at time intervals 204 over time 206 for the selected time window [$T_I$, $T_F$]. The Unix team can designate an acceptable impact level or impact threshold, on the order of 0.37 in this example. The impact threshold identifies any periods 208 within which patching should be avoided. Further, this designated impact threshold indicates that a patching intervention incurs acceptable impacts both prior 210 and after 212, that/those unacceptable period(s) 208. Thus quantifying overall impact 200, the Unix team may identify specific, otherwise hidden impacts to schedule intervention options to minimize business impacts.

Advantageously, the preferred impact estimation support tool provides for impact level evaluation of interventions. These impact level evaluations allow support teams to select an optimal time for applying an intervention for minimal customer disruption. The impacts may be viewed graphically for assessing, considering and distinguishing impacts, e.g., to business process, infrastructure and/or application layers. Thus, IT system support can minimize intervention impacts to any enterprise or business. The present invention provides support with an appropriate measurement of intervention impacts for better evaluating and comparing alternate interventions. Further, the present invention facilitates better organizational control for IT environmental changes, focusing more attention on higher impact changes. Support teams have a capability of identifying real impacts of interventions on core customer business activities with greater accuracy. Moreover, the present invention reduces decision making risks, through simulating the effects of each intervention for a given time interval, allowing support to avoid performing interventions during periods of highest exposure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A shared resource system comprising:
   a plurality of client devices;
   a plurality of service provider computers selectively making requested resource capacity available to requesting ones of said plurality of client devices;
   a network, said requested resource capacity being provided to said ones from said plurality of service provider computers over said network;
   a resource provisioning unit allocating requested resources to each requesting client device, allocable resources comprising a plurality of layers (L) of allocable resource elements, said layers including an infrastructure layer ($L_I$), an application layer ($L_A$) and a business process layer ($L_{BP}$);
   an impact estimation support tool estimating a layer weighted impact from system interventions to client activity over a selected time frame and indicating an overall time varying impact over said time frame such that an optimal time may be selected for system interventions, said impact estimation support tool comprising:
      means for collecting element information for affected elements including situational information, and current and historical element information, and
      means for weighting local impacts comprising:
         means for collecting standardized business process impact criticalities;
         means for collecting criticality information for all affected elements from a criticality matrix, collected criticalities indicating layer by layer impact importance on final impact; and
         means for determining layer weights ($\alpha_{BP}$, $\alpha_A$, $\alpha_I$) responsive to said collected criticalities; and
   one or more management elements scheduling and managing interventions for minimized client disruption, whereby disruption to said client devices being provided resources is minimized by applying said system interventions.

2. A shared resource system as in claim 1, wherein said impact estimation support tool propagates intervention inputs through connected system layer elements.

3. A shared resource system as in claim 2, wherein said impact estimation support tool determines intervention input impacts to system layer elements at an infrastructure layer, an applications layer and a business process layer, and aggregates layer element impacts to determine collective impacts at selected times within said selected time frame, wherein varying specific intervention impacts during said selected time window indicates suitable times within said selected time window for performing intervention associated tasks.

4. A shared resource system as in claim 1, wherein said impact estimation support tool comprises:
   a network description;
   a criticality matrix;
   a business impact linker;
   an expert knowledge collection;
   an application dependency mapper; and
   a situational factors description.

5. A shared resource system as in claim 4, wherein said network description includes network information and topology describing the connections among network elements reachable from each element.

6. A shared resource system as in claim 4, wherein said criticality matrix indicates how critical each infrastructure element is over the whole system, the indication quantifying criticality of each infrastructure element for the whole system.

7. A shared resource system as in claim 4, wherein said business impact linker links IT elements with customer business impacts at a business process layer.

8. A shared resource system as in claim 4, wherein said expert knowledge collection contains practical experience information collected from subject-matter experts and intervention historical data.

9. A shared resource system as in claim 4, wherein said application dependency mapper maps application layer dependencies between impacted elements.

10. A shared resource system as in claim 4, wherein said plurality of service provider computers are cloud computers, said plurality of client devices are cloud client devices, and said situational factors description describes factors affecting elements in at least one cloud layer to impact a particular client enterprise during the selected time frame, said at least one cloud layer being selected from an infrastructure layer, an applications layer and a business process layer.

11. A shared resource system as in claim 1, said impact estimation support tool receiving a change request requesting changes to said shared resource system, said impact estimation support tool comprising:
means for identifying shared resource system elements (E) affected by implementing the requested change;
means for determining individual impacts (I(L,E,T)) to elements in each shared resource system layer (L) at a given time (T) in a selected time frame ($[T_I, T_F]$);
means for determining an overall impact (I(E,T)) to client activity at said given time responsive to said individual impacts;
means for returning to determining individual impacts at a next given time ($T_I \leq T \leq T_F$) until said next given time is after said selected time frame; and
means for determining a time within said time frame having a minimum overall impact for implementing said requested change, wherein implementing said requested change to said shared resource system at said determined time minimizes disruption of provided said resources to said client devices.

12. A shared resource system as in claim 11, wherein said means for identifying shared resource system elements (E) comprises means for collecting network information describing connections among the elements that are reachable from each element E and mapped dependencies between elements among the elements impacted elements (N(E)).

13. A shared resource system comprising:
a plurality of client devices;
a plurality of service provider computers selectively making resource capacity available to requesting ones of said plurality of client devices;
a network, said requested resource capacity being provided to said ones from said plurality of service provider computers over said network;
a resource provisioning unit allocating requested resources to each requesting client device; and
an impact estimation support tool estimating the impact from system interventions to client activity over a selected time frame and indicating time varying impact over said time frame such that an optimal time may be selected for system interventions, said impact estimation support tool receiving a change request requesting changes to said shared resource system, said impact estimation support tool comprising:
means for identifying shared resource system elements (E) affected by implementing the requested change,
means for determining individual impacts (I(L,E,T)) to elements in each shared resource system layer (L) at a given time (T) in a selected time frame ($[T_I, T_F]$),
means for determining an overall impact (I(E,T)) to client activity at said given time responsive to said individual impacts, wherein said layers include an infrastructure layer (LI), an application layer (LA) and a business process layer (LBP), and said means for determining said overall impact comprises:
means for collecting element information for affected elements including situational information, and current and historical element information, and
means for weighting local impacts, wherein said means for weighting local impacts comprises:
means for collecting standardized business process impact criticalities,
means for collecting criticality information for all affected elements from a criticality matrix, collected criticalities indicating layer by layer impact importance on final impact, and
means for determining layer weights ($\alpha BP$, $\alpha A$, $\alpha I$) responsive to said collected criticalities;
means for returning to determining individual impacts at a next given time ($T_I \leq T \leq T_F$) until said next given time is after said selected time frame, and
means for determining a time within said time frame having a minimum overall impact for implementing said requested change; and
one or more management elements scheduling and managing interventions for minimized client disruption, whereby disruption to said client devices being provided resources is minimized by applying said system interventions.

14. A shared resource system as in claim 11, wherein said means for determining said time within said time frame comprises means for displaying impacts graphically in a graphical user interface (GUI).

15. A shared resource system as in claim 1, wherein said shared resources requested by said requesting ones are virtual machines (VMs).

16. A shared resource system as in claim 15, wherein said system interventions are for one or more of said VM image changes to one of provider system hardware and provider software.

17. A shared resource system as in claim 11, wherein said shared resources requested by said requesting ones are virtual machine (VM) images and said change request requests a system intervention for changes to one of provider system hardware and provider software for one or more of said VM images.

18. A shared resource system as in claim 13, wherein said overall impact has the form: $I(E,T) = f(\alpha_{BP} * I(L_{BP}, E, T), \alpha A * I(L_A, E, T), \alpha_I * I(L_I, E, T))$.

* * * * *